US012693692B2

(12) United States Patent     (10) Patent No.: US 12,693,692 B2

Schmitz et al.     (45) Date of Patent: Jul. 28, 2026

(54) FLUID HANDLING PROTECTION SYSTEM

(71) Applicant: Carlisle Fluid Technologies, LLC, Scottsdale, AZ (US)

(72) Inventors: Daniel Schmitz, Scottsdale, AZ (US); Scott Powers, Scottsdale, AZ (US); Eric Donaldson, Scottsdale, AZ (US)

(73) Assignee: Binks US, LLC, Shoreview, MN (US)

( * ) Notice: Subject to any disclaimer, the term of this patent is extended or adjusted under 35 U.S.C. 154(b) by 0 days.

(21) Appl. No.: 18/851,821

(22) PCT Filed: Apr. 4, 2023

(86) PCT No.: PCT/US2023/017448
§ 371 (c)(1),
(2) Date: Sep. 27, 2024

(87) PCT Pub. No.: WO2023/196325
PCT Pub. Date: Oct. 12, 2023

(65) Prior Publication Data
US 2025/0199550 A1    Jun. 19, 2025

Related U.S. Application Data

(60) Provisional application No. 63/327,086, filed on Apr. 4, 2022.

(51) Int. Cl.
| | |
|---|---|
| *G05D 16/00* | (2006.01) |
| *F04B 49/06* | (2006.01) |
| *F04B 49/20* | (2006.01) |
| *F04C 11/00* | (2006.01) |
| *F04C 14/08* | (2006.01) |
| *F04C 14/28* | (2006.01) |
| *F04C 2/10* | (2006.01) |
| *F04C 18/08* | (2006.01) |

(52) U.S. Cl.
CPC ........... *G05D 16/024* (2019.01); *F04B 49/20* (2013.01); *F04C 14/28* (2013.01); *F04B 49/065* (2013.01); *F04B 2205/01* (2013.01); *F04C 2/10* (2013.01); *F04C 11/00* (2013.01); *F04C 14/08* (2013.01); *F04C 18/08* (2013.01); *F04C 2270/18* (2013.01)

(58) Field of Classification Search
CPC ........ F04C 18/08; F04C 2/10; F04C 2270/18; F04C 14/08; F04C 14/28; F04C 11/00; F04B 49/065; F04B 49/20; F04B 2205/01; F04B 9/12; G05D 16/024
USPC ................................................ 417/44.3, 44.4
See application file for complete search history.

(56) References Cited

U.S. PATENT DOCUMENTS

| | | | | |
|---|---|---|---|---|
| 2,945,446 A | * | 7/1960 | Mason | ................. F04D 15/0218 415/24 |
| 4,330,238 A | * | 5/1982 | Hoffman | ............... F04B 49/065 417/19 |

(Continued)

*Primary Examiner* — William M Mccalister
(74) *Attorney, Agent, or Firm* — Greenberg Traurig LLP; Michael K. Dixon

(57) ABSTRACT

A fluid handling protection system configured to prevent cavitation in a first pump can include a first pump, a first pump fluid inlet line, a first pump fluid outlet line, a first pump drive unit, wherein the first pump drive unit is operatively coupled to the first pump, a first pressure sensor, and a control unit, wherein the control unit is operatively coupled to the first sensor and the first pump drive unit.

20 Claims, 2 Drawing Sheets

(56) References Cited

U.S. PATENT DOCUMENTS

| | | | | |
|---|---|---|---|---|
| 5,755,974 | A * | 5/1998 | McBrayer, Jr. | G05D 16/2093 |
| | | | | 210/741 |
| 5,772,403 | A * | 6/1998 | Allison | F04B 49/065 |
| | | | | 417/44.2 |
| 6,487,903 | B2 * | 12/2002 | Sabini | F04D 15/0272 |
| | | | | 417/44.2 |
| 8,543,245 | B2 * | 9/2013 | Heitman | F04B 49/065 |
| | | | | 702/50 |
| 10,138,882 | B1 * | 11/2018 | Self | F04B 49/20 |
| 10,993,727 | B1 * | 5/2021 | Chesavage | A61B 17/1355 |
| 2002/0150476 | A1 * | 10/2002 | Lucke | A61M 1/3607 |
| | | | | 417/42 |
| 2016/0177952 | A1 * | 6/2016 | Larsen | E03F 7/10 |
| | | | | 417/68 |
| 2016/0290334 | A1 * | 10/2016 | Overend | B29B 7/728 |
| 2019/0055945 | A1 * | 2/2019 | Coeckelbergs | F04C 25/02 |
| 2019/0249660 | A1 * | 8/2019 | Coeckelbergs | F04C 28/00 |
| 2019/0264677 | A1 * | 8/2019 | Lake | F04B 17/03 |

* cited by examiner

FLUID HANDLING PROTECTION SYSTEM

BACKGROUND

Disclosed is a fluid handling protection system, and specifically, a system comprising a first pump, a first pump fluid inlet line, a first pump fluid outlet line, a first pump drive unit, wherein the first pump drive unit is operatively coupled to the first pump, a first pressure sensor, and a control unit, wherein the control unit is operatively coupled to the first sensor and the first pump drive unit.

SUMMARY

A fluid handling protection system configured to prevent cavitation in a first pump can include a first pump, a first pump fluid inlet line, a first pump fluid outlet line, a first pump drive unit, wherein the first pump drive unit is operatively coupled to the first pump, a first pressure sensor, and a control unit, wherein the control unit is operatively coupled to the first sensor and the first pump drive unit.

DETAILED DESCRIPTION

Before any embodiments are explained in detail, it is to be understood that the embodiments are not necessarily limited in their application to the details of construction and the arrangement of components set forth in the following description or illustrated in the following drawings. The embodiments can be capable of and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Although directional references, such as upper, lower, downward, upward, rearward, bottom, front, rear, upstream, downstream, etc., may be made herein in describing the drawings, these references are made relative to the drawings (as normally viewed) for convenience. These directions are not intended to be taken literally or limit the present invention in any form. In addition, terms such as "first," "second," and "third" are used herein for purposes of description and are not intended to indicate or imply relative importance or significance.

Figure 1:
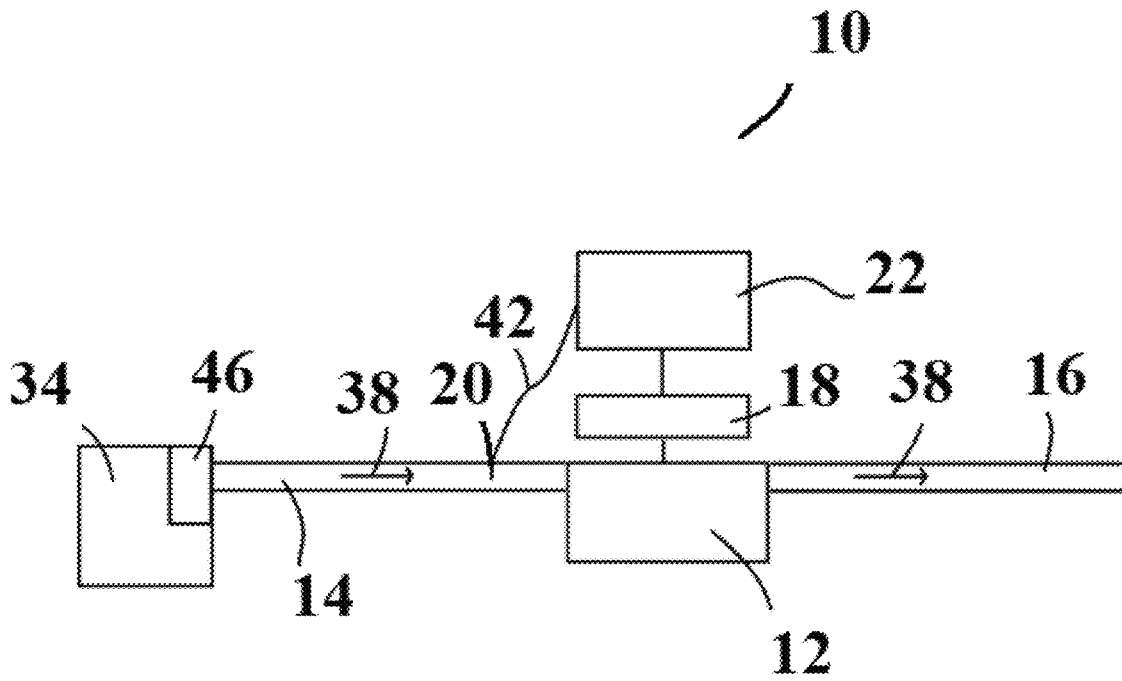
FIG. 1 is a block diagram of the embodiments disclosed herein.
Figure 2:
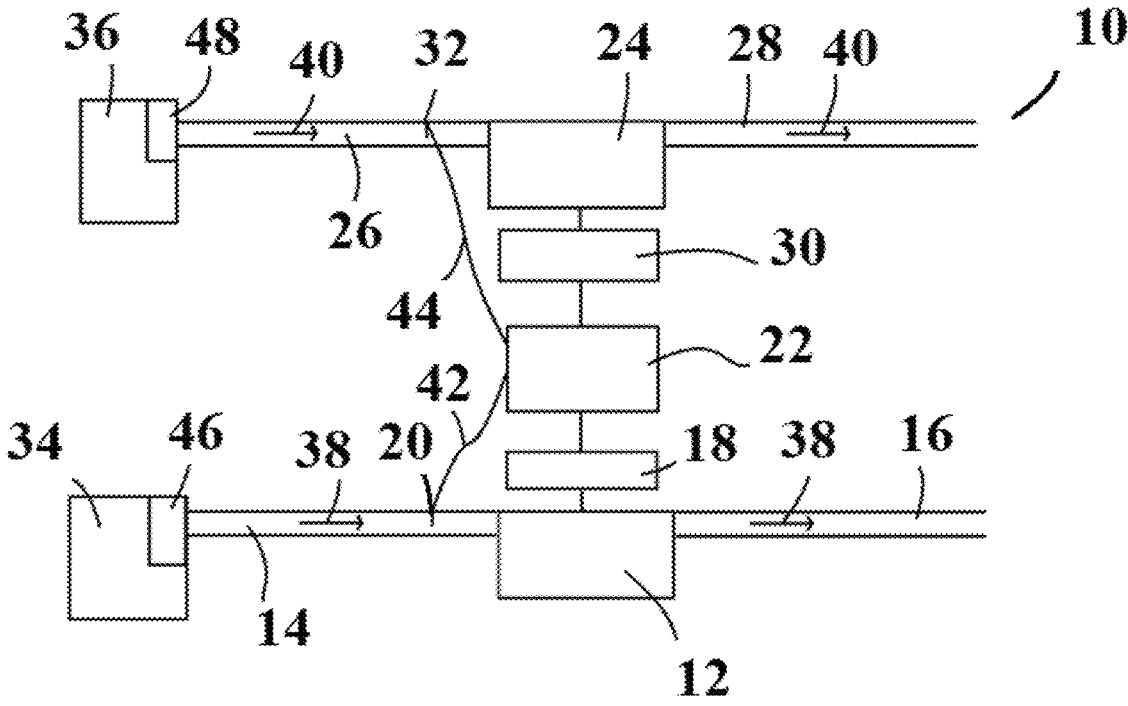
FIG. 2 is an example, non-limiting block diagram of the embodiments disclosed herein.

As shown in FIGS. 1 and 2, a system 10 can include a first pump 12, a first pump fluid inlet line 14, a first pump fluid outlet line 16, a first pump drive unit 18, wherein the first pump drive unit 18 is operatively coupled to the first pump 12, a first pressure sensor 20; and a control unit 22, wherein the control unit 22 is operatively coupled to the first sensor and the first pump drive unit 18. According to certain embodiments, the system 10 can include a first fluid source 34 comprising a first fluid, wherein the first pump 12 is in fluid communication with the first fluid source 34 via the first pump fluid inlet line 14. According to certain embodiments, the system 10 can provide that the first pressure sensor 20 is located within the first fluid inlet line. According to certain embodiments, the system 10 can provide that the control unit 22, in operation, continuously receives, in real time, a first pressure signal from the first pressure sensor 20. The pressure sensors can be coupled to the control unit 22 by a first sensor connection to the control unit 42 and a second sensor connection to the control unit 44, which can be a wireless connection or ethernet cable, and can include an analog to digital converter. According to certain embodiments, the system 10 can provide that the control unit 22 is configured to compare the first pressure signal with a first pressure threshold. In some embodiments, the first pressure threshold represents a minimum inlet pressure. According to certain embodiments, the system 10 can provide that the first pressure threshold is based on a real time first pump 12 speed. According to certain embodiments, the system 10 can provide that the control unit 22 is configured to receive the real time first pump 12 speed from the first pump drive unit 18, and based on detection that the first pressure signal is below the first pump 12 threshold, lower the speed of the first pump 12 via communication to the first pump drive unit 18 such that the first pump 12 speed does not exceed the first pressure threshold. According to certain embodiments, the system 10 can provide that the first pressure threshold comprises a lower first pressure setpoint and a higher first pressure setpoint, wherein the first pressure threshold is dynamic and has a first direct relationship between 0% first pump 12 speed as a maximum at the lower first pressure setpoint and 100% pump speed as a maximum at the higher first pressure setpoint. In some embodiments, the first direct relationship is linear. In some embodiments, the lower first pressure setpoint is programmable by an operator at the control unit 22. According to certain embodiments, the system 10 can provide that the higher first pressure setpoint is programmable by an operator at the control unit 22. In some embodiments, the control unit 22 is preset with a lower first pressure setpoint at 5 psi and a higher first pressure setpoint at 60 psi. In some embodiments, the first pump 12 is a gear pump. According to certain embodiments, the system 10 can include a first inlet pressure generating mechanism 46, wherein the first inlet pressure generating mechanism 46 can be an elevation system 10, transfer pump, or combination thereof. According to certain embodiments, the system 10 can provide that the first inlet pressure generating mechanism 46 is a transfer pump, wherein the transfer pump is a pneumatically actuated piston pump. In some embodiments, the system 10 of claim 1, can further include a second pump 24, a second pump fluid inlet line 26, a second pump fluid outlet line 28, a second pump drive unit 30, wherein the second pump drive unit 30 is operatively coupled to the second pump 24, a second pressure sensor 32; and wherein the control unit 22 is operatively coupled to the second sensor and the second pump drive unit 30. According to certain embodiments, the system 10 can provide a second fluid source 36 comprising a second fluid, wherein the second pump 24 is in fluid communication with the second fluid source 36 via the second pump fluid inlet line 26. In some embodiments, the second pressure sensor 32 is located within the second fluid inlet line. In some embodiments, the control unit 22, in operation, continuously receives, in real time, a second pressure signal from the second pressure sensor 32. According to certain embodiments, the system 10 can provide that the control unit 22 is configured to compare the second pressure signal with a second pressure threshold. In some embodiments, the second pressure threshold represents a minimum inlet pressure. In certain embodiments, the threshold can represent a minimum pressure to prevent cavitation in the pump. In some embodiments, the second pressure threshold is based on a real time second pump 24 speed. According to certain embodiments, the system 10 can provide that the control unit 22 is configured to receive the real time second pump 24 speed from the second pump drive unit 30, and based on detection that the second pressure signal is below the second pump 24 threshold, lower the speed of the second pump 24 via communication to the second pump drive unit 30 such that the second pump 24 speed does not exceed the second pressure threshold. According to certain embodiments, the system 10 can provide that the second pressure threshold comprises a lower second pressure setpoint and a higher second pressure setpoint, wherein the second pressure threshold is dynamic and has a second direct relationship between 0% second pump 24 speed as a maximum at the lower second pressure setpoint and 100% pump speed as a maximum at the higher second pressure setpoint. In some embodiments, the second direct relationship is linear. In some embodiments, based on detection that a pump fluid inlet pressure is above the threshold, the system 10 can automatically raise the pump speed of the first pump 12 or second pump 24 to the desired pump speed, or closer to it, while not exceeding the minimum threshold. In some embodiments, the lower second pressure setpoint is programmable by an operator at the control unit 22. In some embodiments, the higher second pressure setpoint is programmable by an operator at the control unit 22. According to certain embodiments, the system 10 can provide that the control unit 22 is preset with a lower second pressure setpoint at 5 psi and a higher second pressure setpoint at 60 psi. According to certain embodiments, the system 10 can provide that the second pump 24 is a gear pump. According to certain embodiments, the system 10 can provide a second inlet pressure generating mechanism 48, wherein the second inlet pressure generating mechanism 48 can be an elevation system 10, transfer pump, or combination thereof. In some embodiments, the second inlet pressure generating mechanism 48 is a transfer pump, wherein the transfer pump is a pneumatically actuated piston pump.

According to certain embodiments, a system 10 can include a first pump 12 and a second pump 24, a first pump fluid inlet line 14 and a second pump fluid inlet line 26, a first pump fluid outlet line 16 and a second pump fluid outlet line 28, a first pump drive unit 18 and a second pump drive unit 30, wherein the first pump drive unit 18 is operatively coupled to the first pump 12 and the second pump drive unit 30 is operatively coupled to the second pump drive unit 30, a first pressure sensor 20 in the first fluid inlet line and a second pressure sensor 32 in the second fluid inlet line; and a control unit 22, wherein the control unit 22 is operatively coupled to the first sensor, the second pressure sensor 32, the first pump drive unit 18, and the second pump drive unit 30. As shown in FIG. 2, the first fluid flow direction 38 and second fluid flow direction 40 show that the pressure sensor is upstream of the first pump 12 and second pump 24. In some embodiments, the system 10 can include a first fluid source 34 comprising a first fluid and a second fluid source 36 comprising a second fluid, wherein the first pump 12 is in fluid communication with the first fluid source 34 via the first pump fluid inlet line 14 and the second pump 24 is in fluid communication with the second fluid source 36 via the second pump fluid inlet line 26. According to some embodiments, the first fluid can include an isocyanate or polyol, and the second fluid can include an isocyanate or polyol. In some embodiments, the first pressure sensor 20 is located within the first fluid inlet line and the second pressure sensor 32 is in the second fluid inlet line. In some embodiments, the control unit 22, in operation, continuously receives, in real time, a first pressure signal from the first pressure sensor 20 and a second pressure signal from the second pressure sensor 32. In some embodiments, the control unit 22 is configured to compare the first pressure signal with a first pressure threshold and the second pressure signal with a second pressure threshold. According to certain embodiments, the first pressure threshold represents a minimum inlet pressure. According to certain embodiments, the first pressure threshold is based on a real time first pump 12 speed. In some embodiments, the control unit 22 is configured to receive the real time first pump 12 speed from the first pump drive unit 18, and based on detection that the first pressure signal is below the first pump 12 threshold, lower the speed of the first pump 12 via communication to the first pump drive unit 18 such that the pump speed does not exceed the first pressure threshold. In some embodiments, the control unit 22 is configured to lower the speed of the second pump 24 via communication to the second pump drive unit 30 based on detection that the first pressure signal is below the first pump 12 threshold in order to maintain a preset ratio of first fluid through the first fluid outlet and second fluid through the second fluid outlet. In some embodiments, the first pressure threshold comprises a lower first pressure setpoint and a higher first pressure setpoint, wherein the first pressure threshold is dynamic and has a first direct relationship between 0% first pump 12 speed as a maximum at the lower first pressure setpoint and 100% pump speed as a maximum at the higher first pressure setpoint. In some embodiments, the first direct relationship is linear. According to certain embodiments, the control unit 22, in operation, continuously receives, in real time, a second pressure signal from the second pressure sensor 32 and a first pressure signal from the first pressure sensor 20. In some embodiments, the control unit 22 is configured to compare the second pressure signal with a second pressure threshold and the first pressure signal with a first pressure threshold. In some embodiments, the second pressure threshold represents a minimum inlet pressure. According to certain embodiments, the second pressure threshold is based on a real time second pump 24 speed, wherein the control unit 22 is configured to receive the real time second pump 24 speed from the second pump drive unit 30, and based on detection that the second pressure signal is below the second pump 24 threshold, lower the speed of the second pump 24 via communication to the second pump drive unit 30 such that the pump speed does not exceed the second pressure threshold, wherein the control unit 22 is configured to lower the speed of the first pump 12 via communication to the first pump drive unit 18 based on detection that the second pressure signal is below the second pump 24 threshold in order to maintain a preset ratio of second fluid through the second fluid outlet and first fluid through the first fluid outlet, wherein the second pressure threshold comprises a lower second pressure setpoint and a higher second pressure setpoint, wherein the second pressure threshold is dynamic and has a second direct relationship between 0% second pump 24 speed as a maximum at the lower second pressure setpoint and 100% pump speed as a maximum at the higher second pressure setpoint, wherein the second direct relationship is linear. In some embodiments, based on detection that a pump fluid inlet pressure is above the threshold, the system 10 can automatically raise the pump speed of the first pump 12 or second pump 24 to the desired pump speed, or closer to it, while not exceeding the minimum threshold.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A system comprising:
a first pump;
a first pump fluid inlet line;
a first pump fluid outlet line;
a first pump drive unit, wherein the first pump drive unit is operatively coupled to the first pump;
a first pressure sensor;
a control unit, wherein the control unit is operatively coupled to the first sensor and the first pump drive unit;
wherein the control unit, in operation, continuously receives, in real time, a first pressure signal from the first pressure sensor;
wherein the control unit is configured to compare the first pressure signal with a first pressure threshold;
wherein the first pressure threshold represents a minimum inlet pressure;
wherein the first pressure threshold is based on a real time first pump speed; and
wherein the first pressure threshold comprises a lower first pressure setpoint and a higher first pressure setpoint, wherein the first pressure threshold is dynamic and has a first direct relationship between 0% first pump speed as a maximum at the lower first pressure setpoint and 100% pump speed as a maximum at the higher first pressure setpoint.

2. The system of claim 1, further comprising a first fluid source comprising a first fluid, wherein the first pump is in fluid communication with the first fluid source via the first pump fluid inlet line.

3. The system of claim 2, wherein the first pressure sensor is located within the first fluid inlet line.

4. The system of claim 1, wherein the control unit is configured to receive the real time first pump speed from the first pump drive unit, and based on detection that the first pressure signal is below the first pump threshold, lower the speed of the first pump via communication to the first pump drive unit such that the first pump speed does not exceed the first pressure threshold.

5. The system of claim 1, wherein the first direct relationship is linear.

6. The system of claim 1, wherein the lower first pressure setpoint is programmable by an operator at the control unit.

7. The system of claim 6, wherein the higher first pressure setpoint is programmable by an operator at the control unit.

8. The system of claim 7, wherein the control unit is preset with a lower first pressure setpoint at 5 psi and a higher first pressure setpoint at 60 psi.

9. The system of claim 1, wherein the first pump is a gear pump.

10. The system of claim 9, further comprising a first inlet pressure generating mechanism, wherein the first inlet pressure generating mechanism is an elevation system, transfer pump, or combination thereof.

11. A system comprising:
a first pump;
a first pump fluid inlet line;
a first pump fluid outlet line;
a first pump drive unit, wherein the first pump drive unit is operatively coupled to the first pump;
a first pressure sensor;
a control unit, wherein the control unit is operatively coupled to the first sensor and the first pump drive unit;
wherein the control unit, in operation, continuously receives, in real time, a first pressure signal from the first pressure sensor;
wherein the control unit is configured to compare the first pressure signal with a first pressure threshold;
wherein the first pressure threshold represents a minimum inlet pressure;
wherein the first pressure threshold is based on a real time first pump speed; wherein the first pressure threshold comprises a lower first pressure setpoint and a higher first pressure setpoint, wherein the first pressure threshold is dynamic and has a first direct relationship between 0% first pump speed as a maximum at the lower first pressure setpoint and 100% pump speed as a maximum at the higher first pressure setpoint;
a first fluid source comprising a first fluid, wherein the first pump is in fluid communication with the first fluid source via the first pump fluid inlet line; and
wherein the lower first pressure setpoint is programmable by an operator at the control unit.

12. The system of claim 11, wherein the first pressure sensor is located within the first fluid inlet line.

13. The system of claim 11, wherein the control unit is configured to receive the real time first pump speed from the first pump drive unit, and based on detection that the first pressure signal is below the first pump threshold, lower the speed of the first pump via communication to the first pump drive unit such that the first pump speed does not exceed the first pressure threshold.

14. The system of claim 11, wherein the first direct relationship is linear.

15. The system of claim 11, wherein the higher first pressure setpoint is programmable by an operator at the control unit.

16. The system of claim 15, wherein the control unit is preset with a lower first pressure setpoint at 5 psi and a higher first pressure setpoint at 60 psi.

17. The system of claim 11, wherein the first pump is a gear pump.

18. The system of claim 17, further comprising a first inlet pressure generating mechanism, wherein the first inlet pressure generating mechanism is an elevation system, transfer pump, or combination thereof.

19. A system comprising:
a first pump;
a first pump fluid inlet line;
a first pump fluid outlet line;
a first pump drive unit, wherein the first pump drive unit is operatively coupled to the first pump;
a first pressure sensor;
a control unit, wherein the control unit is operatively coupled to the first sensor and the first pump drive unit;
wherein the control unit, in operation, continuously receives, in real time, a first pressure signal from the first pressure sensor;
wherein the control unit is configured to compare the first pressure signal with a first pressure threshold;

wherein the first pressure threshold represents a minimum inlet pressure;

wherein the first pressure threshold is based on a real time first pump speed; and wherein the first pressure threshold comprises a lower first pressure setpoint and a higher first pressure setpoint, wherein the first pressure threshold is dynamic and has a first direct relationship between 0% first pump speed as a maximum at the lower first pressure setpoint and 100% pump speed as a maximum at the higher first pressure setpoint;

wherein the higher first pressure setpoint is programmable by an operator at the control unit; and wherein the first pressure sensor is located within the first fluid inlet line.

20. The system of claim 19, further comprising a first fluid source comprising a first fluid, wherein the first pump is in fluid communication with the first fluid source via the first pump fluid inlet line.

\* \* \* \* \*